(12) United States Patent
Zhu

(10) Patent No.: US 8,834,682 B2
(45) Date of Patent: Sep. 16, 2014

(54) COAL MATERIAL DECOMPOSITION APPARATUS WITH COMBINED SCREW-TYPE BINS

(75) Inventor: Shucheng Zhu, Nanyang (CN)

(73) Assignee: Xixia Dragon Into Special Material Co., Ltd. (CN)

(*) Notice: Subject to any disclaimer, the term of this patent is extended or adjusted under 35 U.S.C. 154(b) by 18 days.

(21) Appl. No.: 13/814,103

(22) PCT Filed: Nov. 23, 2010

(86) PCT No.: PCT/CN2010/078998
§ 371 (c)(1),
(2), (4) Date: Feb. 4, 2013

(87) PCT Pub. No.: WO2012/062003
PCT Pub. Date: May 18, 2012

(65) Prior Publication Data
US 2013/0126329 A1    May 23, 2013

(30) Foreign Application Priority Data
Nov. 8, 2010 (CN) .......................... 2010 1 0534752

(51) Int. Cl.
| | | |
|---|---|---|
| C10B 53/04 | (2006.01) | |
| C10B 47/30 | (2006.01) | |
| C10B 1/10 | (2006.01) | |
| C10B 7/10 | (2006.01) | |
| C10B 47/44 | (2006.01) | |
| C10L 9/08 | (2006.01) | |

(52) U.S. Cl.
CPC . *C10B 7/10* (2013.01); *C10B 47/44* (2013.01); *C10L 9/08* (2013.01); *C10B 1/10* (2013.01); *C10B 53/04* (2013.01); *C10B 47/30* (2013.01)
USPC ............................. 202/118; 202/131; 202/136

(58) Field of Classification Search
CPC ............ C10B 1/10; C10B 7/10; C10B 47/30; C10B 47/44; C10B 53/04; C10L 9/08
USPC .......................................... 202/118, 131, 136
See application file for complete search history.

(56) References Cited

U.S. PATENT DOCUMENTS 1,828,781 A * 10/1931 Merrill .......................... 202/117
3,787,292 A * 1/1974 Keappler ...................... 202/118
(Continued)

FOREIGN PATENT DOCUMENTS

| CN | 2476720 Y | 2/2002 |
| CN | 2709447 Y | 7/2005 |

(Continued)

OTHER PUBLICATIONS

International Search Report for PCT/CN2010/078998, mail date Aug. 11, 2011.

*Primary Examiner* — Nina Bhat
*Assistant Examiner* — Jonathan Miller
(74) *Attorney, Agent, or Firm* — Rossi, Kimms & McDowell, LLP

(57) ABSTRACT

A coal material decomposition apparatus includes a sealed rotary kiln body provided with a coal inlet and a coal outlet. A coal decomposition gas collecting pipe is arranged in the kiln body and is provided with two parallel spirals for dividing space in the kiln body into a heating gas bin and a coal material decomposition bin. The coal decomposition gas collecting pipe communicates with the coal material decomposition bin through a gas guide hole arranged in the coal material decomposition bin. As the kiln body is internally divided into the a heating gas bin and a coal material decomposition bin isolated from each other, a large amount of hot gas in the heating gas conducts and radiates the heat to pulverized coal in the coal material decomposition bin, and the pulverized coal fully absorbs the heat to be decomposed into gas, coal tar gas and coal with high heat-value.

6 Claims, 2 Drawing Sheets

(56) References Cited

U.S. PATENT DOCUMENTS

| | | | |
|---|---|---|---|
| 3,982,052 A * | 9/1976 | Bearce | 44/501 |
| 4,353,874 A * | 10/1982 | Keller et al. | 422/656 |
| 4,765,255 A * | 8/1988 | Chiarva | 110/226 |
| 5,216,821 A | 6/1993 | McCabe et al. | |
| 5,217,578 A * | 6/1993 | Taciuk et al. | 202/100 |
| 5,227,026 A * | 7/1993 | Hogan | 202/117 |
| 5,944,960 A * | 8/1999 | Nakata et al. | 202/100 |
| 7,144,558 B2 * | 12/2006 | Smith et al. | 422/224 |
| 7,893,307 B2 * | 2/2011 | Smith | 585/241 |
| 8,518,146 B2 * | 8/2013 | Li | 75/359 |
| 2006/0143977 A1 * | 7/2006 | Meijer et al. | 44/629 |

FOREIGN PATENT DOCUMENTS

| | | |
|---|---|---|
| CN | 201850248 U | 6/2011 |
| JP | 2002-192107 A | 7/2002 |

* cited by examiner

US 8,834,682 B2

COAL MATERIAL DECOMPOSITION APPARATUS WITH COMBINED SCREW-TYPE BINS

This application is a U.S. National Phase Application of PCT International Application PCT/CN2010/078998 filed on Nov. 23, 2010, which is based on and claims priority from CN 201010534752.8 filed on Nov. 8, 2010 the contents of which is incorporated in its entirety by reference.

FIELD OF THE INVENTION

The invention relates to comprehensive utilization of coal material for energy saving and emission reduction, particularly relates to a coal material decomposition apparatus with combined screw-type bins.

BACKGROUND OF THE INVENTION

In conventional technology, coal is used to produce coal gas, natural gas, or used to produce gas by coking at high temperature, medium temperature or low temperature. However, the above-mentioned technology is required to form pulverized coal into lumps or sift lump coal, which increases the cost of raw material, or result in the produced gas without a high heat value, a big additional value, and significant economic and social benefits. The heating mode of furnace can be classified as external-heating mode, internal-heating mode and hybrid-heating mode. The heating medium in external-heating furnace is not contact directly with raw materials and heat is transferred from furnace wall. The heating medium in the internal-heating furnace contacts with the raw materials directly, and the heating methods are classified as solid heat carrier mode and gas heat carrier mode according to different heat mediums.

At present, there are two kinds of conventional coal decomposition apparatus, one of which has an up-draft kiln structure. The up-draft kiln structure is used for combusting flue gas and combustible gases produced by coal, which has low gas purity and a low additional value, as well as partially discharge of gas. This results in a significant resources wasting and environmental pollution. Another kind of coal decomposition equipment has a shaft kiln structure. In the structure, coal lumps are placed on clapboard with holes, and a heater is provided above the coal lumps. Because the coal lumps on the clapboard are accumulated to a certain thickness, so they cannot be uniformly heated and decomposed, and are required to be cyclically heated and decomposed by the decomposed gas. More importantly, since the presence of large amount of holes for ventilation and circulatory function provided on the clapboard, pulverized coal can leak through the holes. To avoid this, it is necessary to process the pulverized coal into coal briquette when introducing it into the shaft kiln. Thus, it will increase the cost of pulverized coal decomposition, and reduce the economic benefits because the pulverized coal cannot be directly used for coal decomposition in up-draft kiln.

There exists a coal material decomposition apparatus, which includes a closed kiln body with a feed inlet and a discharge outlet. A flame gas heating device is arranged in the kiln body. A propulsion and decomposition path of coal material is formed between the flame gas heating device and the inner wall of the kiln body. A coal decomposition gas collecting pipe which is communicated with the propulsion and decomposition path of coal material is arranged on the kiln body. In practice, this process using close-packed pipes is very complex, and heat transfer effect is poor in that heat is transferred mainly by thermal radiation. Additionally, the pipes for the propulsion of coal are also very complex when close-packed decomposition pipes are arranged in the kiln body and high-temperature heating bin is arranged outside the pipes. In this way, the propulsive mechanism and the pipes can also not be easily connected in a hermetical manner, which causes heat exchange to be inadequate.

SUMMARY OF THE INVENTION

To solve the above problems present in prior arts, an object of the present invention is to provide a coal material decomposition apparatus with combined screw-type bins, by which the pulverized coal can be separated rapidly with a heat exchange rate in a safe and convenient manner.

According to the present invention, a coal material decomposition apparatus with combined screw-type bins comprises a sealed rotary kiln body provided with a coal inlet and a coal outlet. A coal decomposition gas collecting pipe is arranged in the kiln body. The coal decomposition gas collecting pipe is provided with two parallel spirals. The internal edge is closely connected with the coal decomposition gas collecting pipe, and the external edge is closely connected with the inner wall of the kiln body. The two parallel spirals divide the space in the kiln body into a heating gas bin and a coal material decomposition bin. The heating gas bin is connected to a heating device and provided with a heating gas guide hole. The coal material decomposition bin is connected to the coal inlet and provided with a coal outlet. The coal decomposition gas collecting pipe is communicated with the coal material decomposition bin through a gas guide hole arranged in the coal material decomposition bin.

According to an embodiment of the invention, the heating device comprises a fuel supply pipe, an air supply pipe and a combustion chamber.

According to an embodiment of the invention, the gas heating device is an electric heating device.

According to an embodiment of the invention, a heat conducting plate is arranged on the spirals.

In this invention, a coal decomposition gas collecting pipe is arranged in the kiln body and provided with two parallel spirals for dividing space in the kiln body into a heating gas bin and a coal material decomposition bin isolated from each other. Therefore, a large amount of hot gas in the heating gas bin brought into staggered contacts with the coal material decomposition bin through a helicoid, conducting and radiating the heat to the pulverized coal in the coal material decomposition bin, and the pulverized coal can fully absorb the heat so as to be heated for being decomposed into the gas, coal tar gas and coal with high heat-value in the coal material decomposition bin. The coal decomposition gas can be collected effectively and rapidly by the coal decomposition gas collecting pipe, and discharged out of the kiln body for use in subsequent process. By turning the kiln of the present invention to drive the two spirals, coal material in the coal material decomposition bin move forward. This spiral distribution in the kiln with high utilization increases the amount of feed and the rate of discharge. The division of the kiln space by the combined double spirals extends the path of the coal material moving in the high-temperature heating gas atmosphere, increases the contact area between the heating gas bin and the coal material decomposition bin, which achieve a more sufficient decomposition effect. Coal material in the kiln body is heated by heating gas in a form of gas circulation, which allows heat to be further taken sufficiently and reduce heat loss on the one hand, and reduces the exhaust emission on the other hand. Such decomposition apparatus for coal disclosed by the present invention makes the decomposition and separation of the pulverized coal more fast and efficient so as to save and fully utilize energy and greatly increase the utilization rate and level of coal resources, thus it will produce a significant economic and social benefits for the entire society.

BRIEF DESCRIPTION OF THE DRAWINGS

The accompanying drawings facilitate an understanding of the various embodiments of this invention, in which.

DETAILED DESCRIPTION OF THE INVENTION

Embodiment 1

Figure 1:
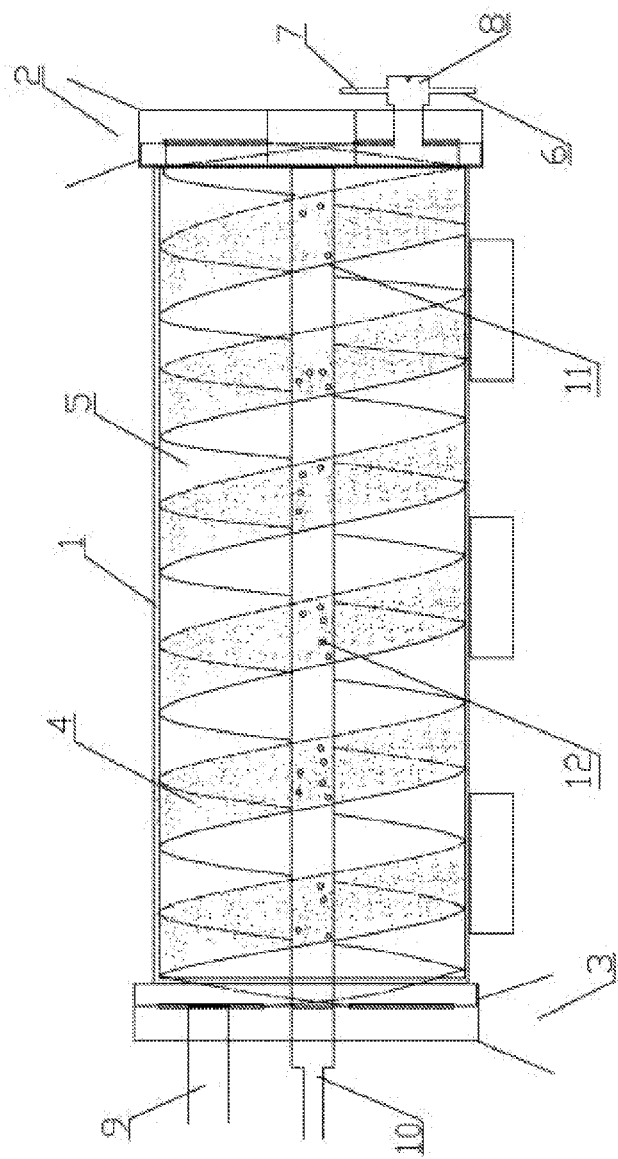
FIG. 1 is a structure diagram according to the present invention.

As shown in FIG. 1, a coal material decomposition apparatus with combined screw-type bins comprises a sealed rotary kiln body 1 provided with a coal inlet 2 and a coal outlet 3. A coal decomposition gas collecting pipe 10 is arranged in the kiln body 1. The coal decomposition gas collecting pipe 10 is provided with two parallel spirals 11. The internal edge of the spirals 11 is closely connected with the coal decomposition gas collecting pipe 10, and the external edge is closely connected with the inner wall of the kiln body 1. The two parallel spirals 11 divide the space in the kiln body 1 into a heating gas bin 5 and a coal material decomposition bin 4. The heating gas bin 5 is connected to a heating device and provided with a heating gas guide hole 9. The coal material decomposition bin 4 is connected to the coal inlet 2 and provided with a coal outlet 3 at the other end. The coal decomposition gas collecting pipe 10 is communicated with the coal material decomposition bin 4 through a gas guide hole 12 arranged in the coal material decomposition bin 4. The heating device comprises a fuel supply pipe 6, an air supply pipe 7 and a combustion chamber 8. There is heat conducting plate arranged on the spirals to improve the heat transfer between the two bins.

Embodiment 2

A coal material decomposition apparatus with combined screw-type bins comprises a sealed rotary kiln body 1 provided with a coal inlet 2 and a coal outlet 3. A coal decomposition gas collecting pipe 10 is arranged in the kiln body 1. The coal decomposition gas collecting pipe 10 is provided with two parallel spirals 11. The internal edge of the spirals 11 is closely connected with the coal decomposition gas collecting pipe 10, and the external edge is closely connected with the inner wall of the kiln body 1. The two parallel spirals 11 divide the space in the kiln body 1 into a heating gas bin 5 and a coal material decomposition bin 4. The heating gas bin 5 is connected to a heating device and provided with a heating gas guide hole 9. The coal material decomposition bin 4 is connected to the coal inlet 2 and provided with a coal outlet 3 at the other end. The coal decomposition gas collecting pipe 10 is communicated with the coal material decomposition bin 4 through a gas guide hole 12 arranged in the coal material decomposition bin 4. The gas heating device is an electric heating device. There is a heat conducting plates arranged on the spirals to improve the heat transfer between the two bins.

Figure 2:
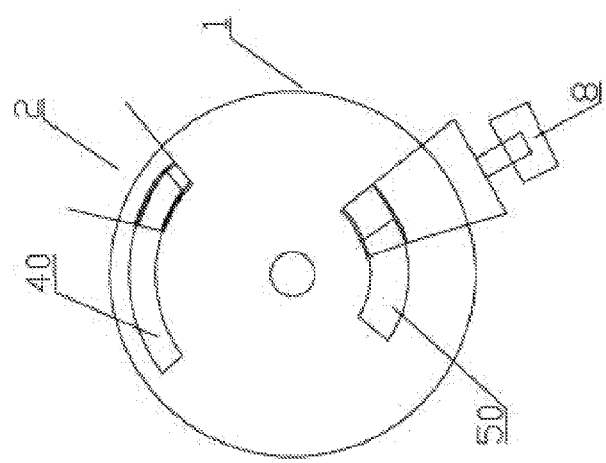
FIG. 2 is a structure diagram showing a feed inlet in the kiln body for feeding material and hot gas.

Feed and heat can be hermetically introduced into the kiln body in many ways, e.g. as shown in FIG. 2. The end face of the kiln body 1 is provided with a hermetic coal blending port 40, which is communicated with the coal material decomposition bin 4. The coal inlet 2 is coupled with the hermetic coal blending port 40 hermetically. The end face of the kiln body 1 is provided with a hermetic gas distribution port 50, which is communicated with the heating gas bin 5. The combustion chamber 8 is coupled with the hermetic gas distribution port 50 hermetically. The hermetic coal blending port 40 and the hermetic gas distribution port 50 is not located on a same circumference.

What is claimed is:

1. A coal material decomposition apparatus with combined screw-type bins, comprising:
    a sealed rotary kiln body provided with a coal inlet and a coal outlet,
    wherein a coal decomposition gas collecting pipe is arranged in the kiln body, the coal decomposition gas collecting pipe is provided with two parallel spirals, the internal edge of the spirals is closely connected with the coal decomposition gas collecting pipe, and the external edge is closely connected with the inner wall of the kiln body, and
    wherein the two parallel spirals divide the space in the kiln body into a heating gas bin and a coal material decomposition bin, the heating gas bin is connected to a heating device and provided with a heating gas guide hole, the coal material decomposition bin is connected to the coal inlet and provided with the coal outlet at an end of the coal material decomposition bin, and the coal decomposition gas collecting pipe is communicated with the coal material decomposition bin through a gas guide hole arranged in the coal material decomposition bin.

2. The coal material decomposition apparatus with combined screw-type bins according to claim 1, wherein the heating device comprises a fuel supply pipe, an air supply pipe and a combustion chamber.

3. The coal material decomposition apparatus with combined screw-type bins according to claim 1, wherein the gas heating device is an electric heating device.

4. The coal material decomposition apparatus with combined screw-type bins according to claim 1, wherein a heat conducting plate is arranged on the spirals.

5. The coal material decomposition apparatus with combined screw-type bins according to claim 2, wherein a heat conducting plate is arranged on the spirals.

6. The coal material decomposition apparatus with combined screw-type bins according to claim 3, wherein a heat conducting plate is arranged on the spirals.

\* \* \* \* \*